May 19, 1953  A. F. ROBERTSON ET AL  2,639,210
RECORDING DECELEROMETER
Filed Aug. 24, 1948  7 Sheets-Sheet 1

Fig. 1.

Inventor
A. F. Robertson
J. R. Tallackson
M. O. Hayes
By
Attorney

Inventor
A. F. Robertson
J. R. Tallackson
By
M. O. Hayes
Attorney

May 19, 1953 A. F. ROBERTSON ET AL 2,639,210
RECORDING DECELEROMETER
Filed Aug. 24, 1948 7 Sheets-Sheet 6

Inventor
A. F. Robertson
J. R. Tallackson
By M. C. Hayes
Attorney

May 19, 1953  A. F. ROBERTSON ET AL  2,639,210
RECORDING DECELEROMETER

Filed Aug. 24, 1948  7 Sheets-Sheet 7

Inventor
A. F. Robertson
J. R. Tallackson
By
Attorney

Patented May 19, 1953

2,639,210

UNITED STATES PATENT OFFICE 2,639,210

RECORDING DECELEROMETER

Alexander F. Robertson, Charlottesville, Va., and
John R. Tallackson, Oak Ridge, Tenn.

Application August 24, 1948, Serial No. 45,962

11 Claims. (Cl. 346—38)

(Granted under Title 35, U. S. Code (1952),
sec. 266)

This invention relates generally to accelerometers and more particularly to a new and improved piezoelectric recording accelerometer particularly adapted for use within an aircraft planted mine which will withstand the severe shock caused by a mine striking the surface of a body of water and coming to rest on the bed thereof and in which a record is made of the time of travel of the mine through the water.

In devices of this class heretofore proposed for measuring inertial forces of a body it has been the usual practice to secure the inertia controlled element to the body, the acceleration or deceleration of which is to be measured and effect a recording of the acceleration or deceleration as the case may be, by suitable recording means located at a distance and connected by a length of cable with the inertia controlled element.

In the case of aircraft planted mines in which it is desired to measure the force of impact of the mine with the surface of the water and the force of impact of the mine with the bed of the body of water in addition to the time of travel of the mine through the water it is, of course, necessary that the recording means be secured to the mine and protected from damage such that the record of the desired information may be secured in an undamaged condition after the mine has come to rest. Obviously the devices of the prior arts are unsuited for this purpose by reason of the long cable connecting the recording element and the inertia responsive element and for this reason such devices are not suited for recording shocks which objects receive upon striking the target area when launched at a considerable altitude from an aircraft in flight.

The accelerometer in accordance with the present invention is particularly well suited for obtaining deceleration time records of aircraft launched mines respectively corresponding to the instant of the impact of the mine with the surface of the water, the time of travel of the mine through the water, and the instant of impact of the mine with the bottom, in addition to the time of travel of the mine through the water. This information is of the utmost importance in the design and construction of the various mechanisms employed with the mine and furthermore provides a basis on which equipment may be designed to duplicate launching conditions.

Furthermore the present invention dispenses with the necessity of protracted and rigorous field tests to obtain this information. In addition to the foregoing the instant accelerometer provides information in regard to the deceleration caused by violent shocks received by a falling body such as a mine, bomb or other projectiles possessing a high degree of accuracy and detail of information not achieved by devices heretofore employed for this purpose.

It is the object of the present invention to provide a new and improved piezoelectric accelerometer adapted to record acceleration forces as applied to a piezoelectric element by an inertia responsive mass.

A further object is to provide a recording accelerometer adapted to register acceleration time changes of an intertia responsive mass with respect to a piezoelectric element operatively associated therewith.

A further object is to provide a new and improved recording accelerometer wherein a cathode-ray tube is adapted to impress upon a sensitized film signals indicative of the voltage communicated thereto from a piezoelectric element as generated therein responsive to the rate of change of velocity of a movable mass operatively associated therewith.

A still further object is to provide a piezoelectric recording accelerometer wherein the voltage produced within the element responsive to the force of an inertia responsive piston thereagainst is communicated directly to a cathode-ray tube for recording on a moving sensitized film.

A still further object is to provide a recording accelerometer wherein a sensitized film is adapted to register deflections of a light beam as projected from the screen of a cathode-ray tube, the deflections in the beam being proportional to the change in voltage as applied to the deflection plates of the tube from a piezoelectric element responsive to changes in acceleration of a known mass movable thereagainst, the voltage from the element being communicated directly to the biasing plates of the tube without the interposition of any form of amplifying circuit therebetween.

A still further object is to provide a piezoelectric recording accelerometer adapted to be decelerated with the object under test and further adapted to record on the recording medium of the device and concurrently with the recording of the deceleration record thereon spaced markings indicative of predetermined interval of time whereby a subsequent correlation of the markings with the deceleration record may be made to provide an accurate measure of the velocity time change of the object.

Additional objects, features, and advantages of the present invention are those residing in and relating to the novel construction and arrangement of the elements thereof, as will now clearly appear from the following description, reference being made to the accompanying drawings wherein like reference characters will refer to like parts throughout the several views of which:

Figure 1:
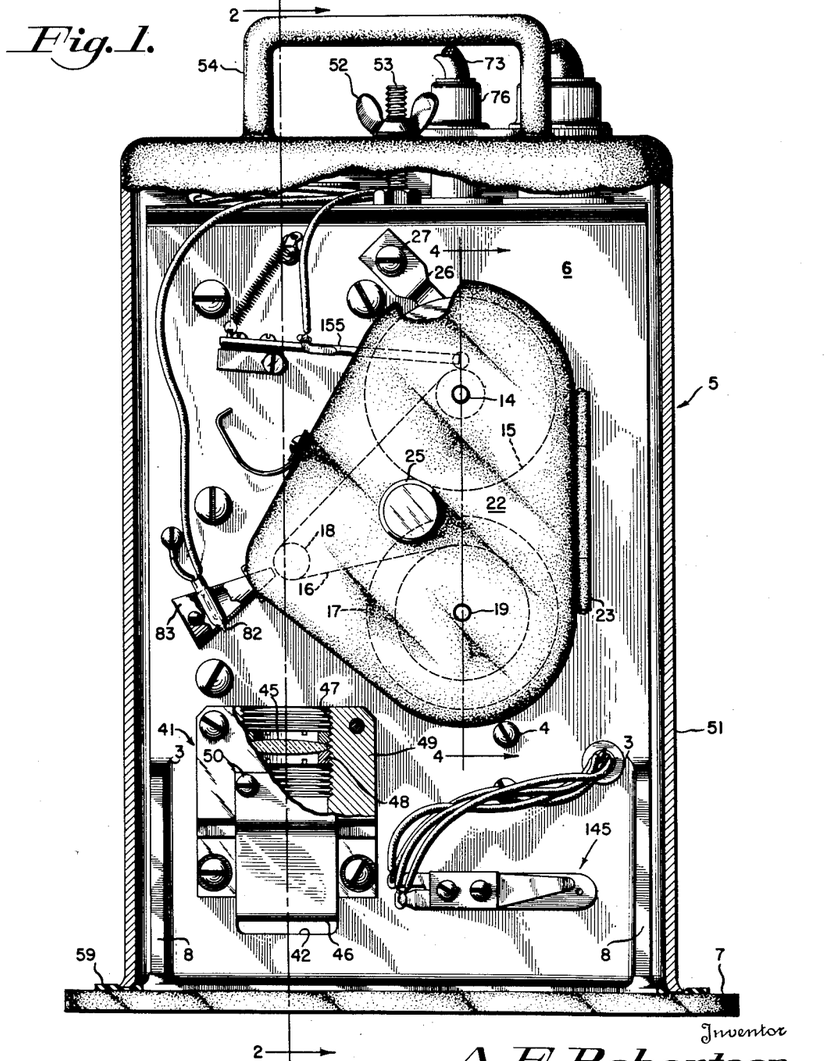
Fig. 1 is a view partly in section and partly in elevation of the recording assembly of the accelerometer according to a preferred embodiment of the invention and showing the reel and optical arrangement.
Figure 2:
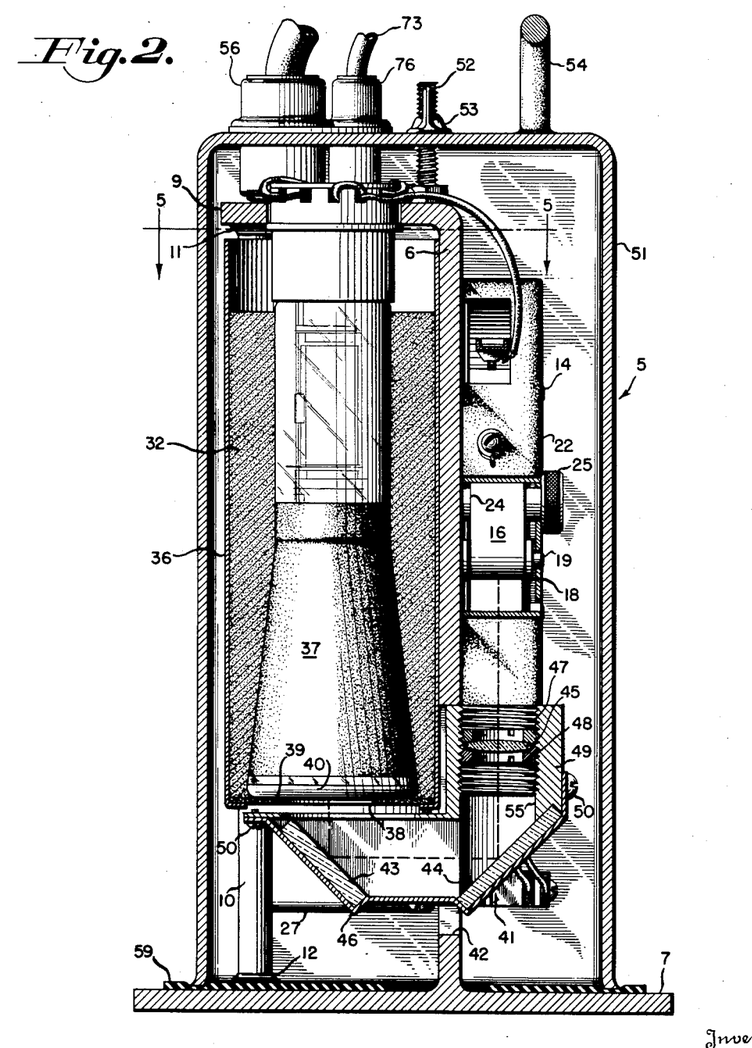
Fig. 2 is a view partly in section and partly in elevation of a section through the chassis and case of the recording assembly taken along line 2—2 of Fig. 1.
Figure 3:
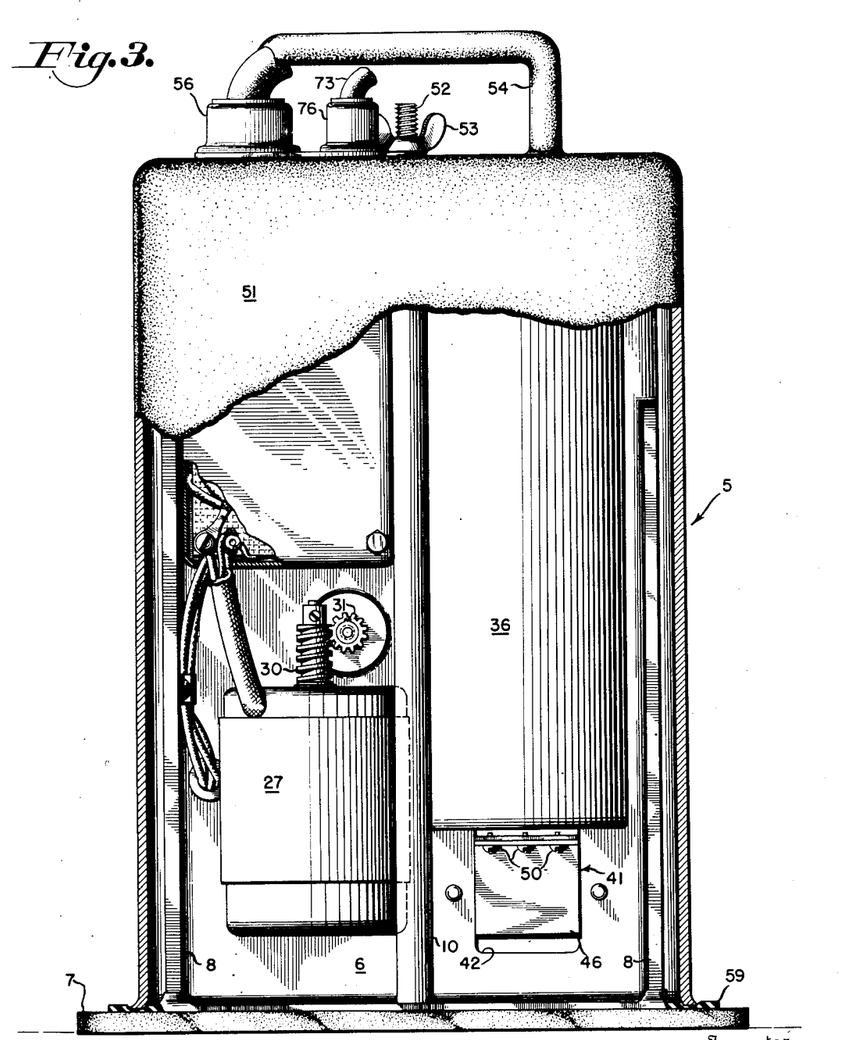
Fig. 3 is a view similar to Fig. 1 and showing the motor and tube arrangement.

Referring now to the drawings and more particularly to Figs. 1, 2, and 3 the recording unit or assembly of the accelerometer generally designated 5 including an upright angular plate member 6 that will hereinafter be referred to as the chassis. The bottom edge of the chassis is secured as by welding to a rectangular base plate 7 to which is fastened in a similar manner a pair of angular braces 8 that add further rigidity to the assembly by their welded connection with the chassis at 3. The angular portion 9 of the chassis is supported as by a bar member 10 connected therewith and to the base plate 7 at 11 and 12 respectively.

Figure 4:
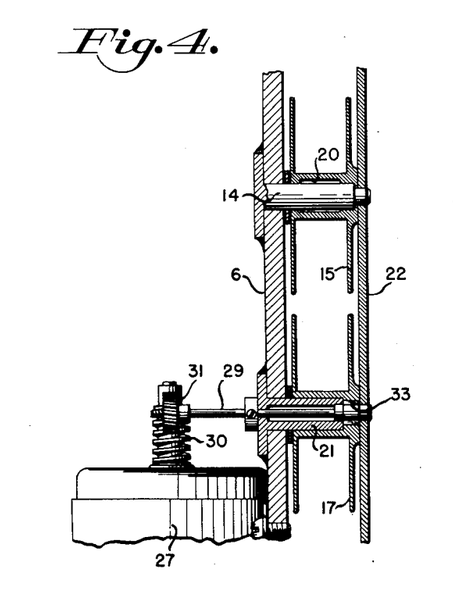
Fig. 4 is a sectional view of the reel drive assembly substantially as seen along line 4—4 of Fig. 1.

Secured to the chassis in any suitable manner as by welding, as illustrated in Fig. 4, are a pair of rigid stud members 14 and 21 over which respectively rotates reels 15 and 17. Wound about reel 15 is a quantity of sensitized film 16 which is communicated, during the operation of the device, to the takeup reel 17 after passing around an idler spool 18 mounted for free rotation upon stud 19 secured to the chassis as by welding in a manner similar to studs 14 and 21. It will be understood, however, that various means may be employed to mount the spools for rotation over the studs such, for example, as reducing the bearing surfaces as illustrated at 20 in Fig. 4 or as by interposing ball bearings between the reel and shaft so as to further reduce the friction therebetween. The spools should be sufficiently free running upon the studs so that at the time of deceleration, as occurs when the mine strikes the water, the friction therebetween will not cause appreciable slowing down of the spools and film carried thereby. Spools 15 and 17 are adapted to telescope over their respective studs and retained thereon as by plate 22 preferably hinged to the chassis as by the heavy hinge member 23. A relatively large stud 24, Figs. 1 and 2, welded to the chassis provides additional support for the plate 22 and when the latter is clamped thereto as by the thumb screw 25.

A spring arm 26 is so arranged and secured to the chassis as by screw 27, as to yieldably bear against the periphery of reel 15 to thereby cause a slight drag upon the reel thereby causing the film to remain taut as it is drawn over the idler spool 18 before being wound upon the takeup reel 17.

A motor 27 of any suitable design is secured to the rear of the chassis as by screws 4 and adapted by means of the shaft connection 29, Fig. 4, to drive spool 17 through the worm and gear 30 and 31 respectively. The shaft is arranged to extend centrally through an opening provided therefor in stud 21 so that the lug equipped end 33 thereof, Fig. 4, will rotate freely beyond the end of the stud to connect with notches 34 and 35, Fig. 9, of reel 17 when the latter is properly telescoped thereover. It is understood that any suitable arrangement may be provided herein for driving the reel 17 from the motor shaft 29.

Figure 5:
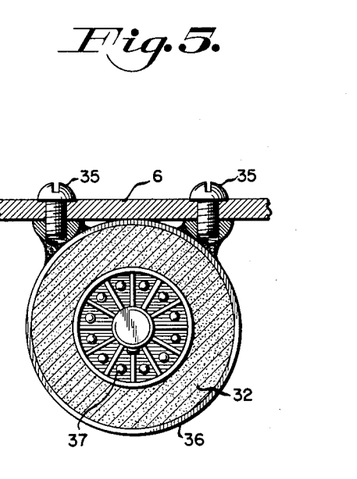
Fig. 5 is a sectional view of the cathode-ray tube housing taken along section line 5—5 of Fig. 2.

Secured to the rear of the chassis as by screws 35, Fig. 5, is a cylindrical steel casing 36 within which is enclosed a small cathode-ray tube 37. A quantity of wax 32, or like substance, is cast about the tube, as illustrated in Fig. 2 to secure the tube rigidly within the casing thereby reducing the possibility of breakage or damage to the tube as the result of shock. A hole 38 is provided in a disk member 39 arranged in the lower end of the casing adjacent the fluorescent screen 40 of the tube whereby an image 81 appearing on the screen may be viewed from a position beneath the tube.

Whereas any suitable type of cathode-ray tube such, for example, as the National Union 2AP-5, may be employed in the foregoing embodiments of the invention, cathode-ray tubes having short-persistence screens must be used in order to record well defined traces for the reason that the time base of the accelerometer is provided by the moving film. Acceleration voltages of from 600 to 700 volts preferably are employed in order to provide a more dense recording but at the expense of deflection sensitivity.

A small optical system generally designated 41, Fig. 2, is adapted to extend through an opening 42 provided therefor in the chassis to align with the screen of the tube whereby the image appearing thereon will be reflected by mirrors 43 and 44 through a lens 45 to be focused thereby on the film as it passes around the idler spool 18. A suitable formed angular plate 46 is secured to the optical housing 49 as by screws 50 and serves to support mirrors 43 and 44 in fixed relation to the lens 45 that may be adjusted with respect thereto and to the film by ring screws 47 and 48 threadedly arranged within the optical housing 55.

A cup shaped cover 51 having a handle portion 54 thereon telescopes over the recording mechanism and is secured in place as by bolt and wing nut 52 and 53 respectively. A light seal is maintained about the base of the cover and terminal connections 56 and 57 by either felt or rubber washers 58 and 59 respectively.

Figure 6:
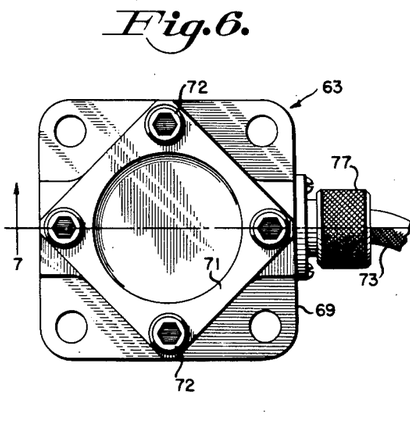
Fig. 6 is a plan view of the crystal pickup assembly.
Figure 7:
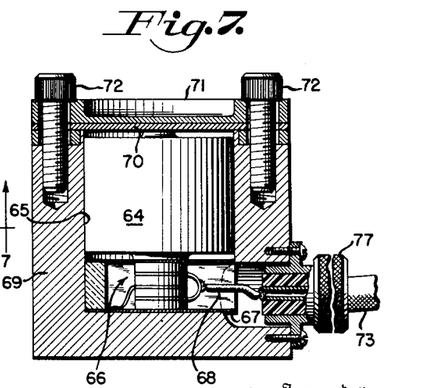
Fig. 7 is a view partly in section and partly in elevation of the pickup assembly as seen along section line 7—7 of Fig. 6.
Figure 8:
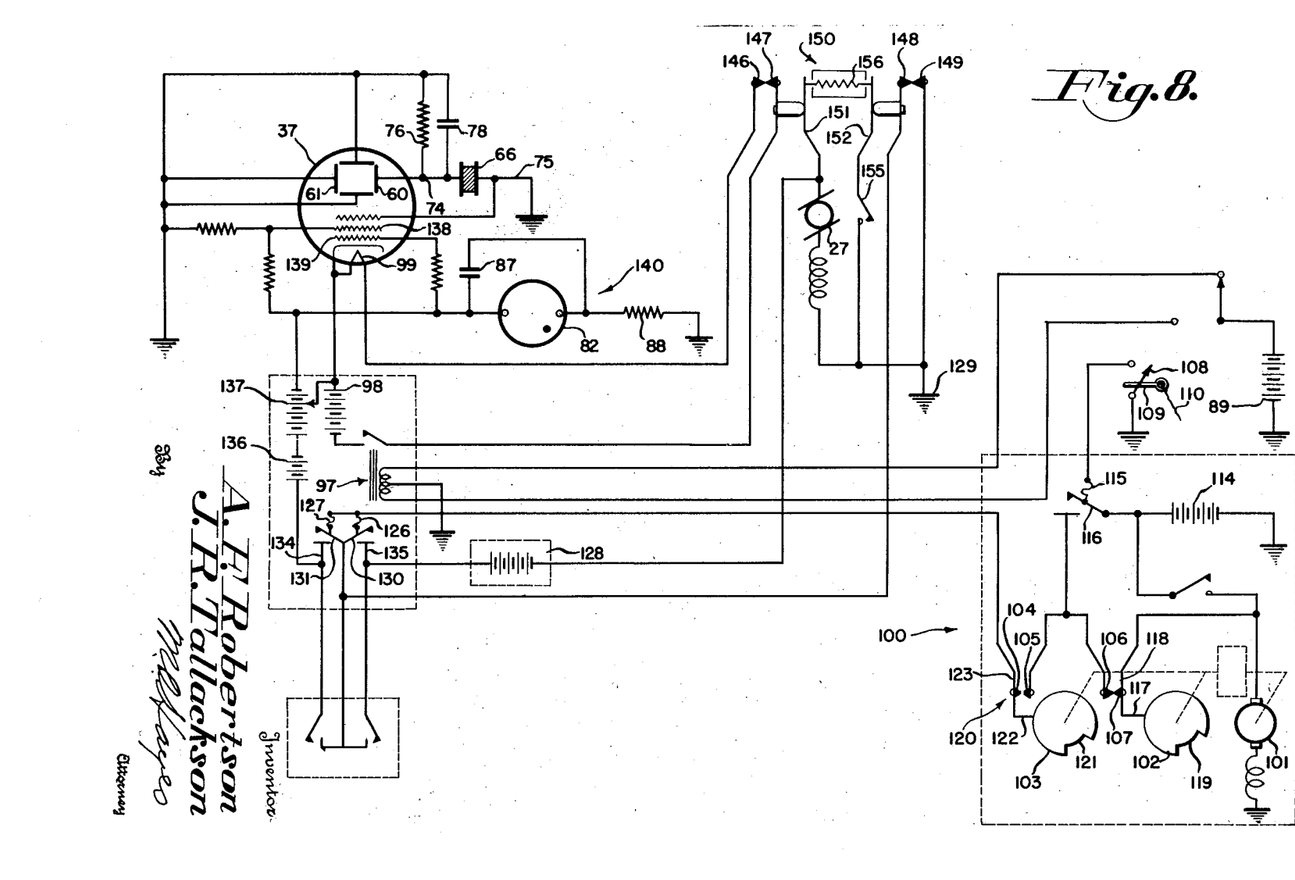
Fig. 8 is a diagrammatic view of the complete electrical system comprising the accelerometer according to the preferred embodiment of the invention.
Figure 9:
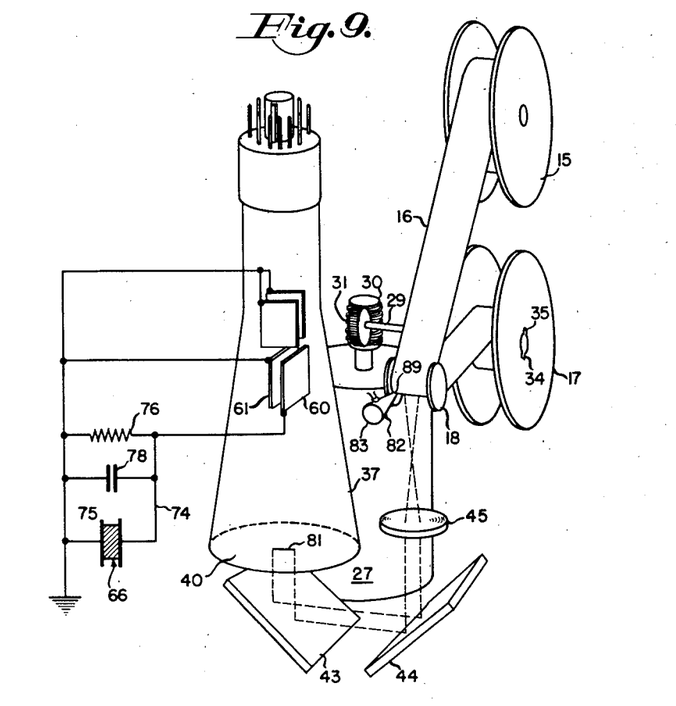
Fig. 9 is a schematic view of the electronic measuring system of Fig. 8 illustrated in cooperative relation with respect to the recording system of the present invention.

Connected to apply voltage to the deflection plates 60 and 61 of the cathode-ray tube, as illustrated in Figs. 8 and 9, is an accelerometer pickup unit or assembly generally designated 63, Figs. 6 and 7. The pickup consist of a steel piston or mass 64 adapted to fit closely within a smooth cylindrical cavity 65 arranged in the housing 69 with one end of the piston bearing against a crystal stack generally designated 66. The terminals 67 and 68 of the crystal are connected to the cable 73 as by the connector 77. A plate spring 70 is drawn against the piston as by cap and screws 71 and 72 respectively that operated to apply a biasing pressure on the stack as screws 72 are tightened so that a subsequent shifting of the piston either to or from the stack will cause a voltage to be generated therein proportional to the rate and degree of movement of the piston. The initial pressure that is to be applied to the crystal element may vary considerably depending upon the type of crystals used such, for example, with Rochelle salt crystals the pressure of the piston thereagainst should be approximately 35 lbs. while with quartz crystals 1000 lbs. pressure is generally required.

Since the spring constant of the crystal stack is much greater than that of the plate spring, the force between the plate spring and piston remains essentially constant when the pickup unit is accelerated, the inertia force of the piston being balanced by a change in force between the crystals and the piston. This is true regardless of the direction of the applied acceleration as long as the inertial force of the piston does not exceed the spring load of the plate spring. If the acceleration is so great that the inertia force exceeds the spring load and in such a direction that the force between the crystal stack and piston is decreased, the piston will leave the crystal stack and the unit will no longer function as an accelerometer until the acceleration is reduced. The maximum acceleration in the opposite direction which the units will record is limited only by the strength of the crystal stack. With quartz-crystal units, the instrument in theory, is capable of measuring component acceleration up to 3000 times that of gravity in one direction and 1500 times gravity in the other. By reason of the electrical components of the device the limitations of the instrument is based upon that of the cathode-ray tube.

The natural frequency of the pickup is dependent upon the spring constant of the crystal stack which is determined by the cross section, length, and elastic modulus and upon the mass of the piston. The unit is capable of picking up without serious distortion either steady state or transient accelerations as long as the frequency spectrum of the acceleration wave contains no frequency of appreciable magnitude in excess of 1/3 the natural frequency of the pickup. The natural frequency of the present pickup unit is in the neighborhood of 3250 cycles per second.

Current generated by the piezoelectric element 66 is communicated directly to the deflection plates 61 and 62 of the cathode-ray tube by the cable 74 which is preferably of the coaxial type, the grounded shield of the cable serving as one terminal of the circuit. Connected in this plate circuit in shunt relation to the crystal element is a suitable resistor 76 of approximately 1000 megohms which is generally sufficient to stabilize the fluorescent spot 81 upon the tube screen 40. The shunt capacity may vary from between 100 to 150 microfarads with negligible results and should still provide a time constant of about 10 to 15 milliseconds. In some cases it may be desirable to add in shunt relation to the element a condenser 78 in order to increase the time constant of the circuit, which will of course reduce somewhat the sensitivity of the instrument.

Figure 12:
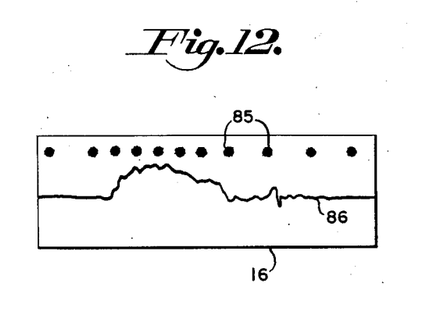
Figs. 12 and 13 illustrate sections of film obtained respectively in the use of the accelerometers of Figs. 9 and 10 in measuring and recording acceleration time characteristics of a moving body.
Figure 13:
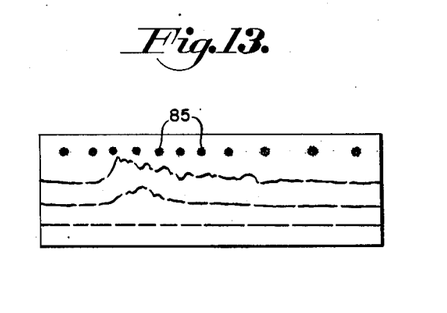

Because of the changes in velocity of the film through the instrument resulting from sudden increases in friction between the moving and fixed parts thereof at the instant of impact of the mine with the water, a relaxation oscillator circuit 140 is provided wherein a neon tube 82 is adapted to expose the film to a series of intermittent flashes of light as directed thereagainst from a cone structure 83 formed preferably of Lucite within which the tube is inserted as illustrated in Figs. 1 and 9. A quantity of opaque paint is applied to the outer surface of the cone after arranging the tube therein thereby preventing stray rays from the tube fogging the film not intended to be exposed. The tip surface 89 of the core is left clear of paint whereby the light from the tube is projected to the surface of the film arranged approximately 1/64 of an inch therefrom. In this manner a series of small dotes 85, Figs. 12 and 13, are exposed on the film concurrently with the trace, thereby providing a time standard by which the acceleration curve 86 may be accurately measured regardless of the changing speed of the film.

The relaxation oscillator circuit including a condenser 87 connected to be charged through the resistor 88 that upon saturation discharges through the neon tube 82 thereby causing the intermittent flashing of the tube at a frequency of, for example, 250 cycles per second. This arrangement provides a far more accurate measure of the deceleration component applied to the mine than is possible with prior art apparatus that depends solely for its accuracy of time base measurement upon the velocity of the recording film. The results of experimentation have proved conclusively, that conventional velocity controlling means are incapable of maintaining the film velocity invariably constant under the severe shock conditions encountered when the accelerometer of the present invention is used for the purpose intended.

Figure 11:
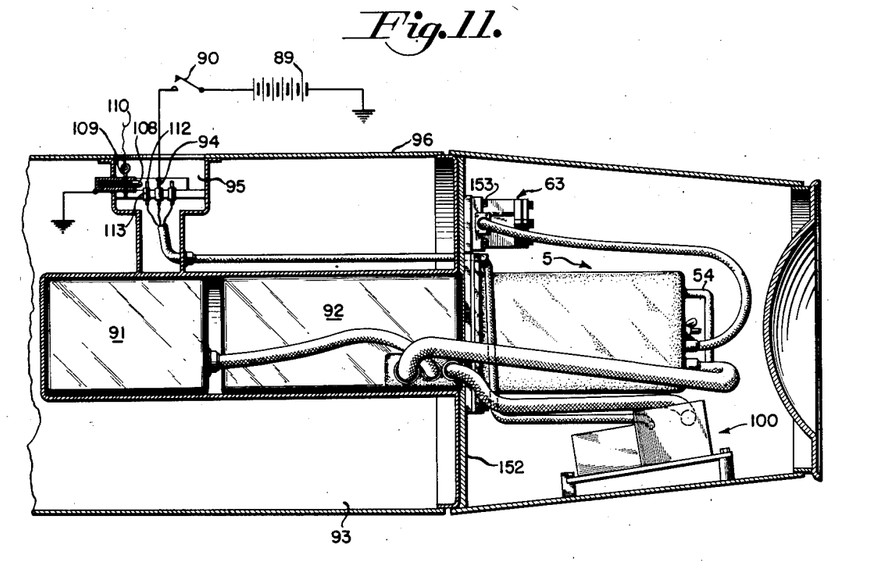
Fig. 11 is a schematic view of the mine case with the accelerometer arranged therein.

Before describing further the operation of the device, attention is directed to Fig. 11 which indicates the relative position of the elements of the accelerometer as arranged within a mine case 96 prior to the operation of releasing the mine from a plane for testing the acceleration forces thereagainst as caused by the mine striking the water.

It will be noted that the heavier components of the accelerometer, namely the battery boxes 91 and 92 along with the recorder unit 5, are positioned centrally of the case thereby to add stability to the mine while in flight, while the explosive compartment 93 is filled with a suitable inertia mass to simulate as near as possible the dynamic characteristics of the actual mine.

The crystal pickup 63 is secured to a bulkhead 152 in the mine as by bolts 153 so that an inertia force as applied to the base of the mine, as occurs when the mine strikes the water, will cause the piston 64 of the pickup to be driven in the direction of the crystal stack to apply a pressure thereagainst proportional to the amplitude of the inertia force.

As apparent from Figs. 8 and 11, battery 89 and control switch 90 therefor are positioned externally of the mine case whereby an electrical connection is made with the mechanism therein through a "Kovar" seal 94, or the like, arranged in the base of a recess 95 provided in the wall of the mine case 96. Shortly before the mine is released, switch 90 is manually closed from a position inside the plane to ground battery 89 through the throw relay assembly 97. This relay is adapted to connect battery 98 to the filament 99 to thereby insure proper heating of the filament and thereby proper functioning of the cathode-ray tube during the test operation of the device.

Since one of the primary objects of the present invention is to obtain acceleration time records of aircraft launched mines as they strike the water, plunge through it, and engage the bottom thereof, it was found necessary to provide as an element of the device a time delay mechanism whereby the operation of the recorder may be delayed during such time as the mine is traveling through the air after being released from a plane flying some distance above the surface of the water. The importance of such a delay mechanism is apparent from the fact that often the time of air flight of the mine is of greater duration than the 12 to 14 seconds required for the film to run through the device.

The time delay mechanism here employed and generally designated 100, Fig. 8, may be of any suitable design such, for example, as that described and claimed in the copending application of Ellis M. Brown et al., Ser. No. 584,996, wherein a motor 101 is connected for driving a pair of cams 102 and 103 that are adapted to open or close spring mounted contacts 104, 105, 106 and 107 selectively to control various circuits through the device after a predetermined lapse of time.

The delay mechanism is put in operation by the closing of switch 108 that is indicated in Fig. 11 as a metal plunger adapted, as pin 109 is removed by the attached wire 110, to move into grounding connection between the mine case 96 and terminal 112 of a second "Kovar" seal 113. This connection establishes a circuit from battery 114 through a fuzable strip 115, Fig. 8, that is thereby caused to be ruptured to release spring switch arm 116 that connects the time motor 101 across battery 114.

The circuit to the timing motor is maintained through the normally open switch contacts 106 and 107 that are maintained in closed position by the cam 102 bearing against the angular extension 117 on spring switch arm 118. The extension being adapted, as notch 119 on the cam is rotated adjacent thereto, to spring into the notch to thereby separate the contacts for breaking circuit to the motor. This operation follows a delay of, for example, 30 seconds during the interval of which contacts 104 and 105 are closed to put in operation the recording mechanism 5.

The closing time of the delay switch 120 that controls the energizing of the recorder mechanism, may be varied to as much as 20 seconds depending upon the distance the plane is expected to be above the water, at the time the mine is released. The time of release must be decided upon at the time of assembly and setting of the delay cam 103, the relative position of notch 121 with respect to the leg 122 on spring switch arm 123 determining the interval of delay between the starting of the cam drive motor 101 and the starting of the film driving motor 27.

As contacts 104 and 105 are closed, fuze strips 126 and 127 are connected across battery 114 through the grounding circuit 129 whereupon the fuzes rupture to free spring switch arms 130, and thereby allowing the switches to move into circuit closing engagement with the respective leads 134 and 135. Switch 131 is operative to ground and thereby connects the terminals of high voltage batteries 136 and 137 to the grids 138 and 139 of the cathode-ray tube and also to the relaxation oscillator circuit 140, the operation of which having been heretofore described. The closing switch 130 completes the circuit to ground from a low voltage battery 128 thereby energizing the motor 125 that immediately begins driving the film through the recorder by its connection with pickup reel 17.

As the mine strikes the water the piston 64 of the pickup 63 is directed against the crystal element 66 with a force proportional to the amplitude of the inertia force applied to the mine. The compression of the crystals causes a proportional voltage to be generated thereby that is applied directly across the plates 60 and 61 of the tube to cause a proportional deflection of the beam therethrough. This beam shift appears in the form of a visible image on the screen surface of the tube from which a recording is made on the moving film 16.

To prevent exhausting of the power supply and further to prevent possible damage to the fluorescent screen of the tube as the result of prolonged exposure to the electron beam, a switch 145 is provided, Figs. 1 and 8 to break the filament circuit, driving motor and high voltage circuits through the device when the film has been exhausted from the supply reel 15. This switch consists of a normally open stack of spring contacts 146, 147, 148 and 149 arranged in said circuits and adapted to be forcibly maintained in closed circuit position as illustrated in Fig. 8 by a Western Electric heating coil #76-A or the like 150. This coil assembly includes a centrally arranged telescoping member adapted to be secured in an extended position as by a quantity of solidified solder.

This telescoping member is so arranged with respect to suitable holes formed in spring switch arms 151 and 152 as to cause the arms to be bent backwards from their normally open circuit position to their closed circuit position against arm 153 and 154 respectively. As switch 155 is closed as the roller equipped switch arm moves into circuit grounding engagement with the body of the reel 15, the current from battery 128 is shunted through the heating coil 156 wound about the telescoping member whereupon as the coil heats the retaining solder to allow the telescoping member to collapse and thereby separate the contacts 146, 147, 148 and 149 and thereby open the various circuit through the device.

After recovery of the mine, the film is removed from the recorder for correlating the resulting trace thereon with the time markings thereon.

Figure 10:
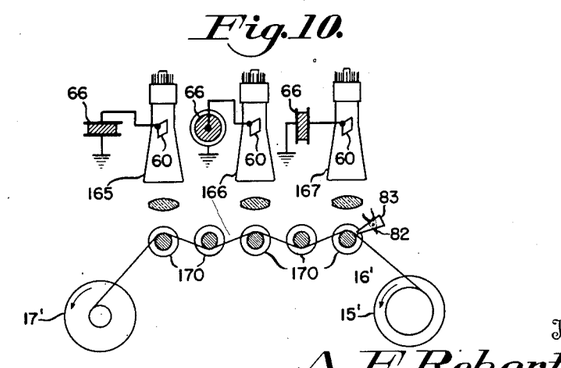
Fig. 10 is a schematic view of a recording accelerometer according to an alternate embodiment of the invention and wherein a number of electronic measuring systems are employed whereby the resultant of three directions of acceleration may be recorded simultaneously.

When more than one acceleration component is desired, individual pickup units are used each being arranged at right angle to the others as illustrated in Fig. 10 and electrically connected, in the heretofore described manner, to its respective cathode-ray tube 165, 166 and 167. The tubes are preferably arranged to concurrently record the acceleration signal on a common film 169 adapted to pass over a plurality of idler spools 170 at a fixed distance from the screen of the tubes.

The timing dots impressed upon the film by the neon tube assembly 83, Fig. 10, will precede the trace of the tube 167 by a small amount and will precede the traces of the tubes 166 and 165 by a greater amount controlled by the length of film between the recording position of the dot and the recording positions of the tubes 167, 166 and 165 with respect thereto. The displacement of the tubes and time interval recording mechanism with respect to one another makes it necessary to locate corresponding time instants on the traces by measuring distances along the tube corresponding to the lengths of tape between the various recording positions.

If desired, the timing oscillator may be coupled in any well-known manner to the grids of the cathode-ray tubes so the traces of the tubes are blanked out during each successive discharge of the neon tube, as indicated at 160 in Fig. 13, whereby the simultaneously photographed trace portions of the tubes may be readily associated with one another and correctly correlated with the time markings individual thereto when the distances between the neon and cathode-ray tubes are known accurately.

Obviously many modifications and variations of the present invention are possible in the light of the above teachings. It is therefore to be understood that within the scope of the appended claims the invention may be practiced otherwise than as specifically described.

The invention described herein may be manufactured and used by or for the Government of the United States of America for governmental purposes without the payment of any royalties thereon or therefor.

What is claimed as new and desired to be secured by Letters Patent is:

1. A recording accelerator of the character disclosed secured within an aircraft planted mine, the deceleration of which is to be recorded, comprising in combination, a housing having a cylindrical bore therein, a piezoelectric element disposed in said bore and adapted to generate voltages selectively in accordance with the rate of contraction and expansion thereof, means for initially loading said element yieldably, means including an inertia responsive piston slideably and guidably disposed within said bore and arranged slideably between said element and loading means in coacting relation with respect to said element for causing said expansion and contraction of the element from the initially loaded condition thereof selectively in accordance with the direction of movement of said mass with respect to the element as the mine is momentarily decelerated in response to the shock of impact of the mine with the water and the bed of the body of water respectively, means including a cathode-ray tube having a pair of electrodes electrically connected to the piezoelectric element for producing deflections of the electron beam of the tube proportional to said voltages to produce an image on the screen of the tube as a visual measure of the sudden deceleration of the mine, and means including a moving film for producing a photographic record of said image indicative of the acceleration-time characteristics of the mine during the planting operation thereof.

2. A recording accelerometer of the character disclosed adapted to be secured to an aircraft planted mine, the sudden deceleration of which is to be recorded as the mine strikes the surface of the water and the bed of the body of water respectively comprising, in combination, a housing having a cylindrical bore therein secured within the mine, a piezoelectric element arranged within said bore in said housing and adapted to generate voltages of opposite polarities selectively in accordance with the contraction or expansion thereof, an inertial piston slideably and guidably arranged within said bore in said housing in abutting relation to said element, a resilient member operatively associated with said piston for yieldably urging said piston in the direction of said element thereby to maintain said element in a predetermined condition of compression sufficient to cause contraction or expansion of the element selectively in accordance with subsequent shifting of the piston as the velocity of the mine is suddenly changed during the planting operation thereof, a second housing secured within the mine, a cathode-ray tube secured within said second housing, said tube having a fluorescent screen and a pair of deflection plates and adapted to generate an electron beam impinging on said screen and to cause deflections of the beam selectively in accordance with voltages applied to said plates, means for electrically connecting said plates directly to said element for effecting deflections of said beam proportional to the voltages generated by said element thereby to produce an image on the screen which provides a visual indication of the rate of change in velocity of the mine, and means including a sensitized film movable within said second housing for photographing said image thereby to provide a deceleration-time record of said mine during the planting operation thereof.

3. A recording accelerometer of the character disclosed adapted to be secured to an aircraft planted mine, the deceleration of which is to be recorded as the mine strikes the surface of the water and the bed of the body of water respectively, comprising, in combination, a housing having a cylindrical bore therein, a piezoelectric element secured within said bore in said housing, a piston slideably and guidably arranged within said bore in said housing and in abutting relation with said element, a resilient member in abutting relation with said piston for yieldably urging the piston in the direction of said element thereby to move the piston to initial position such that said element is in a predetermined condition of compression whereby a voltage is generated by the element selectively in accordance with the direction of movement of the piston from said initial position as the piston is moved therefrom by inertial force as the mine is momentarily decelerated, means including a cathode-ray tube secured to the mine and having a pair of electrodes electrically connected directly to the piezoelectric element for producing deflections of the electron beam of the tube proportional to said voltages, thereby to produce an image on the screen which provides a visual measure of the rate of change of velocity of the mine as the mine receives a sudden shock during the descent thereof, and means including a moving film arranged within the mine for producing a photographic record of said image.

4. In an accelerometer of the character disclosed including a cathode ray tube and means including a moving film for producing a photographic record of the image appearing on the screen of the tube, means for applying a series of photographic marks to the moving film comprising, in combination, a translucent conical device having the apex thereof arranged adjacent the surface of said film, a neon tube arranged within said device, means for causing the light from the neon tube to pass through the apex of said device and focus on said film, and a relaxation oscillator circuit for lighting the tube periodically at predetermined intervals of time.

5. An accelerometer of the character disclosed adapted to be secured to an aircraft launched mine constructed and arranged to measure and record the deceleration of the mine caused by impact of the mine with the water and the bed of the body of water respectively, comprising, in combination, means including a piezoelectric element and a movable coacting inertia mass slideably arranged in such pressure transmitting relation with respect thereto as to cause the element to generate voltages indicative of the deceleration of the mine as the mass moves in response thereto, normally deenergized circuit means including a cathode-ray tube operatively connected directly to said element for effecting deflections of the electron beam of the tube proportional to said voltages thereby to produce an image on the screen of the tube indicative of the deceleration of the mine, means including a sensitized film for producing a photographic record of said image, means including a normally inactive motor for moving the film, means including a normally deenergized relaxation oscillator for applying a series of photographic marks on the moving film in predetermined time spaced relation thereby to provide a plurality of accurate time spaced indications on the film, and a time measuring device adapted to be set into operation as the mine is launched from the aircraft for energizing said circuit means, said motor, and oscillator at the termination of a predetermined interval of time measured by the device.

6. An accelerometer according to claim 5 but further characterized by the provision of means controlled by said film and effective when the film has run out for deenergizing said circuit means, motor, and oscillator.

7. In a recording accelerometer of the character disclosed secured to an aircraft launched mine, constructed and arranged to record the deceleration of the mine caused by the impact of the mine with the water and the bed of the body of water respectively, the combination of a plurality of piezoelectric elements secured to the mine with the axes thereof mutually perpendicular, a plurality of slideably arranged pistons individual to said elements for applying pressure thereto only in response to inertia forces applied to the pistons axially thereof, a plurality of cathode-ray tubes arranged in predetermined spaced and parallel relationship, means for electrically connecting the piezoelectric elements directly to the deflecting plates of the tubes respectively whereby the electron beams of the tube are deflected by voltage signals received from the elements in accordance with X, Y, and Z components of the deceleration force applied to the mine at the moment of impact of the mine with the surface of water and with the bed of the body of water respectively, a length of sensitized film arranged adjacent said tubes such that three separate and distinct traces thereon are obtained from the tubes as the film is moved, means for continuously moving the film past the tubes, and means for applying intermittent time signals to the film adjacent said traces during the movement thereof.

8. In a recording accelerometer of the character disclosed, the combination of a mine adapted to be planted from an aircraft in flight, a casing for said mine, piezoelectric voltage generating means secured within said casing and including a slideably supported mass for applying pressure thereto selectively in accordance with the rate of change of the velocity of the mine as the mine strikes the surface of the water and the bed of the body of water respectively, a cathode-ray tube operatively connected directly to said piezoelectric element and having a screen thereon for indicating the instant position of the electron beam, a movable film disposed adjacent said screen constructed and arranged to record thereon the instant position of said beam as the beam is deflected in response to the voltage of said element, means for moving the film in a direction transverse to the movement of said beam, and means for effecting a plurality of time markings on said film intermediate the recordations corresponding respectively to the moment of impact with the surface and with the bed of the body of water whereby the time of travel of the mine through the water may be measured.

9. An accelerometer for recording the changes in velocity of a mine dropped from an aircraft in flight as the mine strikes the water and the bed of the body of water respectively, comprising a mine casing, a cathode ray tube disposed in said casing, normally deenergized means in said tube for generating an electron beam and for projecting it on the screen of the tube to form an image thereon, means including an inertia responsive mass for deflecting said beam in response to rapid changes in velocity of said mine casing, means including a film for recording the image on said screen, time measuring circuit means for actuating said film moving means and for energizing said beam generating means after a predetermined interval of time measured by the measuring means, and means for initiating operation of said measuring means as the mine is launched from the aircraft.

10. An accelerometer for recording the changes in velocity of a mine dropped from an aircraft in flight as the mine strikes the water and the bed of the body of water respectively comprising a mine casing, a cathode ray tube disposed in said casing, normally deenergized means in said tube for generating an electron beam and for projecting it on the screen of the tube to form an image thereon, means including an inertia responsive mass for deflecting said beam in response to changes in velocity of said mine casing, a film for recording the image on said screen, time measuring means including a motor for actuating said film moving means and for energizing said beams generating means after a predetermined interval of time measured by the measuring means, circuit means including a switch in said casing yieldingly urged to its closed position for energizing said motor when closed, fusible means connected to said switch for maintaining said switch open, and normally open switch means disposed externally of said casing and connected in series with said fusible means across said motor energizing means for selectively energizing said fusible means therefrom as the switch means is closed to rupture the fusible means thereby and close said switch, rupturing of said fusible means electrically isolating said external switch means from said circuit means.

11. An accelerometer for recording the changes in velocity of a mine dropped from an aircraft in flight comprising a mine casing, a cathode ray tube disposed in said casing, means in said tube for generating an electron beam and for projecting it on the screen of the tube to form an image thereon, means including an inertia responsive mass for deflecting said beam in response to rapid changes in velocity of said mine casing, a film for recording the image on said screen, means for moving said film, time measuring circuit means for actuating said film moving means and for energizing said beam generating means after a predetermined interval of time measured by said measuring means, means actuatable as the mine is launched from the aircraft for initiating operation of said measuring means, and means controlled by said film moving means and effective when the film has run out for deactuating said film moving means and said beam generating means.

ALEXANDER F. ROBERTSON.
JOHN R. TALLACKSON.

References Cited in the file of this patent

UNITED STATES PATENTS

| Number | Name | Date |
|---|---|---|
| 2,163,847 | Perry | June 27, 1939 |
| 2,169,726 | George | Aug. 15, 1939 |
| 2,178,471 | DeBruin | Oct. 31, 1939 |
| 2,225,381 | Van Dijck | Dec. 17, 1940 |
| 2,360,639 | Asimow et al. | Oct. 17, 1944 |
| 2,371,626 | Kecskemeti | Mar. 20, 1945 |
| 2,411,401 | Welch | Nov. 19, 1946 |
| 2,428,369 | Kammer | Oct. 7, 1947 |
| 2,441,162 | McPherson | May 11, 1948 |
| 2,488,586 | Diemer | Nov. 22, 1949 |
| 2,501,352 | Opsahl | Mar. 21, 1950 |
| 2,527,562 | McCormick | Oct. 31, 1950 |